(12) United States Patent
Dafoe

(10) Patent No.: US 9,815,622 B2
(45) Date of Patent: Nov. 14, 2017

(54) TRASH CAN ASSEMBLY

(71) Applicant: Richard Dafoe, Hermon, NY (US)

(72) Inventor: Richard Dafoe, Hermon, NY (US)

(*) Notice: Subject to any disclaimer, the term of this patent is extended or adjusted under 35 U.S.C. 154(b) by 0 days.

(21) Appl. No.: 15/371,931

(22) Filed: Dec. 7, 2016

(65) Prior Publication Data

US 2017/0158427 A1   Jun. 8, 2017

Related U.S. Application Data

(60) Provisional application No. 62/263,817, filed on Dec. 7, 2015.

(51) Int. Cl.

| | |
|---|---|
| *B62B 3/00* | (2006.01) |
| *B65F 1/06* | (2006.01) |
| *B65F 1/16* | (2006.01) |
| *B65F 1/14* | (2006.01) |
| *B65F 1/00* | (2006.01) |
| *B65D 33/28* | (2006.01) |
| *B62B 3/02* | (2006.01) |
| *B62B 3/10* | (2006.01) |
| *B62B 5/06* | (2006.01) |
| *B62B 5/04* | (2006.01) |

(52) U.S. Cl.
CPC ............... *B65F 1/068* (2013.01); *B62B 3/02* (2013.01); *B62B 3/106* (2013.01); *B62B 5/0433* (2013.01); *B62B 5/061* (2013.01); *B65D 33/28* (2013.01); *B65F 1/002* (2013.01); *B65F 1/062* (2013.01); *B65F 1/1415* (2013.01); *B65F 1/1452* (2013.01); *B65F 1/1473* (2013.01); *B65F 1/1615* (2013.01); *B65F 1/1646* (2013.01)

(58) Field of Classification Search
CPC .. B65F 1/00; B65F 1/068; B65F 1/002; B65F 1/062; B65F 1/1415; B65F 1/1452; B65F 1/1473; B65F 1/1615; B65F 1/1646; B65F 1/06; B65F 1/1468; B65F 1/1607; B65F 2230/15; B62B 3/02; B62B 3/106; B62B 5/0433; B62B 5/061
See application file for complete search history.

(56) References Cited

U.S. PATENT DOCUMENTS

| | | | | |
|---|---|---|---|---|
| 2,877,923 A | * | 3/1959 | Perez | ........................ B65F 1/14 |
| | | | | 220/561 |
| 3,115,986 A | * | 12/1963 | Grof | ........................ B65F 1/06 |
| | | | | 220/212.5 |

(Continued)

*Primary Examiner* — James M Dolak
(74) *Attorney, Agent, or Firm* — Global Intellectual Property Agency, LLC; Daniel Enea

(57) ABSTRACT

A trash can assembly is provided. The trash can assembly provides a trash can facilitating the removal of trash through a bottom end, rather than an upper end of the trash can. The trash can assembly includes a tapering trash receptacle mountable onto a base and a securing mechanism enabling the trash receptacle to be twistably secured thereon via a plurality of notches disposed on the trash receptacle and a plurality of sockets disposed on the base. The base includes legs for immobilizing the trash receptacle when emptying and wheels for moving the trash can as desired. The base includes a watertight interior compartment sized to receive a box for storing trash bags. The trash can assembly further includes a trash bag having the same size and shape of the trash receptacle and including a length greater than the length of the trash receptacle.

14 Claims, 5 Drawing Sheets

(56) References Cited

U.S. PATENT DOCUMENTS

| | | | | |
|---|---|---|---|---|
| 3,927,786 A | * | 12/1975 | Aboud | B65F 1/06 |
| | | | | 220/4.01 |
| 4,167,271 A | * | 9/1979 | Jorgensen | B62B 3/104 |
| | | | | 16/30 |
| 4,961,514 A | * | 10/1990 | Palmer | B65F 1/08 |
| | | | | 220/23.87 |
| 5,295,606 A | * | 3/1994 | Karwoski | B65F 1/06 |
| | | | | 220/4.01 |
| 5,358,138 A | | 10/1994 | Karwoski | |
| 5,419,453 A | * | 5/1995 | Lochridge | B65F 1/06 |
| | | | | 220/495.06 |
| 5,562,229 A | * | 10/1996 | Callahan | A47G 29/06 |
| | | | | 150/154 |
| 6,109,002 A | * | 8/2000 | McCabe | B65F 1/02 |
| | | | | 220/495.08 |
| 6,253,949 B1 | | 7/2001 | Dickson | |
| 6,508,377 B1 | * | 1/2003 | Griswold | B65F 1/06 |
| | | | | 220/495.06 |
| 7,108,150 B1 | | 9/2006 | Rouse et al. | |
| 7,500,430 B2 | * | 3/2009 | Claflin | B30B 9/3039 |
| | | | | 100/100 |
| 7,913,871 B2 | | 3/2011 | Fisher | |
| 2003/0005617 A1 | * | 1/2003 | Holverson, Jr. | A01K 97/04 |
| | | | | 43/41 |
| 2003/0209549 A1 | * | 11/2003 | Grimes | B65F 1/06 |
| | | | | 220/495.08 |
| 2006/0157548 A1 | | 7/2006 | Bastiani | |

* cited by examiner

TRASH CAN ASSEMBLY

CROSS REFERENCE TO RELATED APPLICATIONS

This application claims the benefit of U.S. Provisional Application No. 62/263,817 filed on Dec. 7, 2015. The above identified patent application is herein incorporated by reference in its entirety to provide continuity of disclosure.

BACKGROUND OF THE INVENTION

The present invention relates to trash can systems for collecting and disposing trash. More specifically, the present invention relates to a trash can assembly facilitating the removal of trash through a bottom end, rather than an upper end of the trash can, by means of a tapering trash receptacle mountable onto a base and a securing mechanism enabling the trash receptacle to be twistably secured and removed from the base.

It is often the practice to position large receptacles of trash in areas where many people congregate. The receptacles used range between ten to fifty gallon cylindrical containers or cans. To capture the trash and enable easy disposal of the same, large plastic bags are normally placed in the cans. When filled, the bags are removed for eventual placement in a dump site.

A problem with this arrangement is that when the plastic bags are filled and ready for removal, lifting the bags from the upper opening of the cans becomes onerous. When a plastic bag becomes filled, the bag forces out air from between the can and the plastic bag, thereby creating a partial vacuum when the plastic bag is being removed. The creation of the partial vacuum causes the removal of the bag from the can to be difficult, thereby requiring a greater lifting force which can be difficult to achieve for a lot of users.

Another problem with these receptacles is that they offer no storage solution for additional trash bags. In order to insert another bag within the receptacle, a user must retrieve a bag from an often distant and inconvenient location, thereby wasting time and expending unnecessary effort.

It is therefore an object of the invention to provide a new and improved trash can assembly which solves these problems.

SUMMARY OF THE INVENTION

In view of the foregoing disadvantages inherent in the known types of trash can systems now present in the prior art, the present invention provides a trash can assembly wherein the same can be utilized for providing convenience for the user when collecting and disposing trash. The present invention comprises a trash receptacle including an upper end having an opening and a bottom end having an opening. The trash receptacle tapers in diameter from the bottom end to the upper end, such that the opening of the bottom end includes a diameter larger than a diameter of the opening of the upper end. The opening of the upper end provides access to an interior volume of the trash receptacle, which is configured to receive a trash bag therein. The bottom end includes a lip extending therefrom that defines the opening of the bottom end. A plurality of notches are annularly disposed around the lip and extending perpendicularly outward relative therefrom. A base including an interior channel is configured to mountably receive the lip of the trash receptacle. The interior channel is annularly disposed about an interior of the base, wherein the lip of the trash receptacle is configured to rotate within the channel. The interior channel includes a plurality of sockets configured to slidably receive the plurality of notches thereunder. The plurality of sockets are disposed about an upper perimeter edge of the channel, each of the plurality of sockets include a wall extending into the channel that is configured to stop a forward progression of the plurality of notches and secure the notches under the plurality of sockets. A plurality of legs are disposed annularly about a lower perimeter edge of the base. The plurality of legs extend downward and outward at an angle relative to the base. A plurality of wheels are rotatably coupled to the base. The plurality of wheels are disposed annularly about a lower end of the base.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
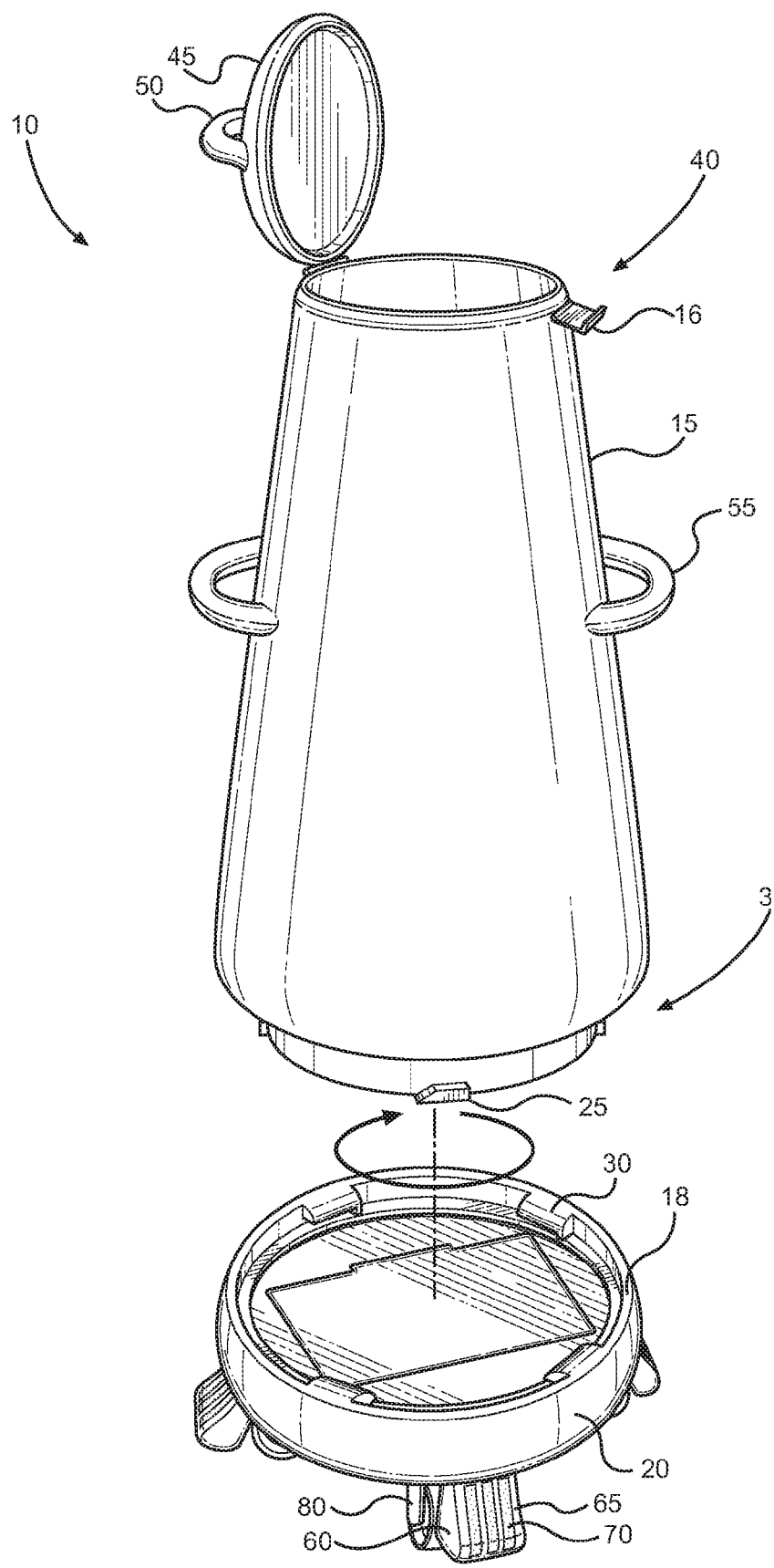
FIG. 1 shows an exploded view of the trash can assembly.

Reference is made herein to the attached drawings. Like reference numerals are used throughout the drawings to depict like or similar elements of the trash can assembly. The figures are intended for representative purposes only and should not be considered to be limiting in any respect.

Referring now to FIG. 1, there is shown an exploded view of the trash can assembly. The present invention provides a trash can assembly 10 that facilitates the collection and removal of trash through the bottom end of a trash can, rather than the upper end of the trash can. The trash can assembly 10 includes a trash receptacle 15 mountable onto a base 20. The trash can assembly 10 includes a locking mechanism enabling he trash receptacle 15 to be inserted into the base 20 and secured to one another. In the depicted embodiment, the locking mechanism comprises a plurality of notches 25 disposed on the trash receptacle 15 and a plurality of sockets 30 disposed on the base 20, wherein the trash receptacle 15 and base twist in opposing directions, such that the notches 25 secure within the sockets 30.

The trash receptacle 15 includes a cylindrical housing having a hollow interior volume that is configured to receive a trash bag therein. The trash receptacle 15 includes a bottom end 35, an upper end 40 having an opening, and a lid 45 hingedly connected to an edge of the upper end 40 for providing access to the opening of the upper end 40 and the interior volume. In one embodiment, the lid 45 includes a handle 50 that facilitates the opening and closing of the lid 45. In another embodiment, the trash receptacle 15 includes a latch 16 for fastening the lid 45 to the trash receptacle 15. In the depicted embodiment, the trash receptacle 15 includes a conical shape, wherein the trash receptacle 15 tapers from the bottom end 35 to the upper end 40, such that the diameter of the trash receptacle 15 gradually decreases from the bottom end 35 to the open end 40. In one embodiment, the trash receptacle 15 includes a pair of handles 55 disposed on opposing sides thereof for grasping and transporting the trash can assembly 10.

The base 20 includes a plurality of legs 60 that are evenly disposed around a lower perimeter edge of the base 20. The plurality of legs 60 protrude vertically downward relative to an upper end 18 of the base 20 and extend outwardly and away from the base 20 at an angle. In one embodiment, the base 20 includes four legs positioned evenly around the lower perimeter edge. The plurality of legs 60 further include a front face 65 having a curved surface that provides an area for a user to position his or her foot when utilizing the trash can assembly 10. In one embodiment, each of the front faces 65 of the plurality of legs 60 includes a grip that provides a means for gripping a leg when placing a foot thereon, such that a user may immobilize the trash can assembly 10 when using same. In the depicted embodiment, the grip includes a plurality of strips 70 extending along the longitudinal length of a leg. The plurality of strips 70 include a high-friction material, such as an adhesive or abrasive material.

The base 20 further includes a plurality of wheels 80 for facilitating the transportation of the trash can assembly 10 to various locations as desired by a user. The plurality of wheels 80 are positioned behind the plurality of legs 60, such that there is a wheel positioned behind a leg at each of the plurality of legs 60. The plurality of wheels 80 are rotatably coupled to the bottom of the base 20 such that the plurality of wheels 80 can turn and move in any direction. The plurality of wheels 80 include a length greater than the plurality of legs 60, such that the plurality of legs 60 are suspended above the ground when the plurality of wheels 80 are placed on the ground. In this way, the plurality of legs 60 do not interfere with the movement of the trash can assembly 10 when moving it across a surface. Since the plurality of wheels 80 makes the trash can mobile at all times, the front face 65 of the plurality of legs 60 provides a user a surface to place their foot to immobilize the trash can assembly 10 when removing or employing the trash receptacle 15.

Figure 2:
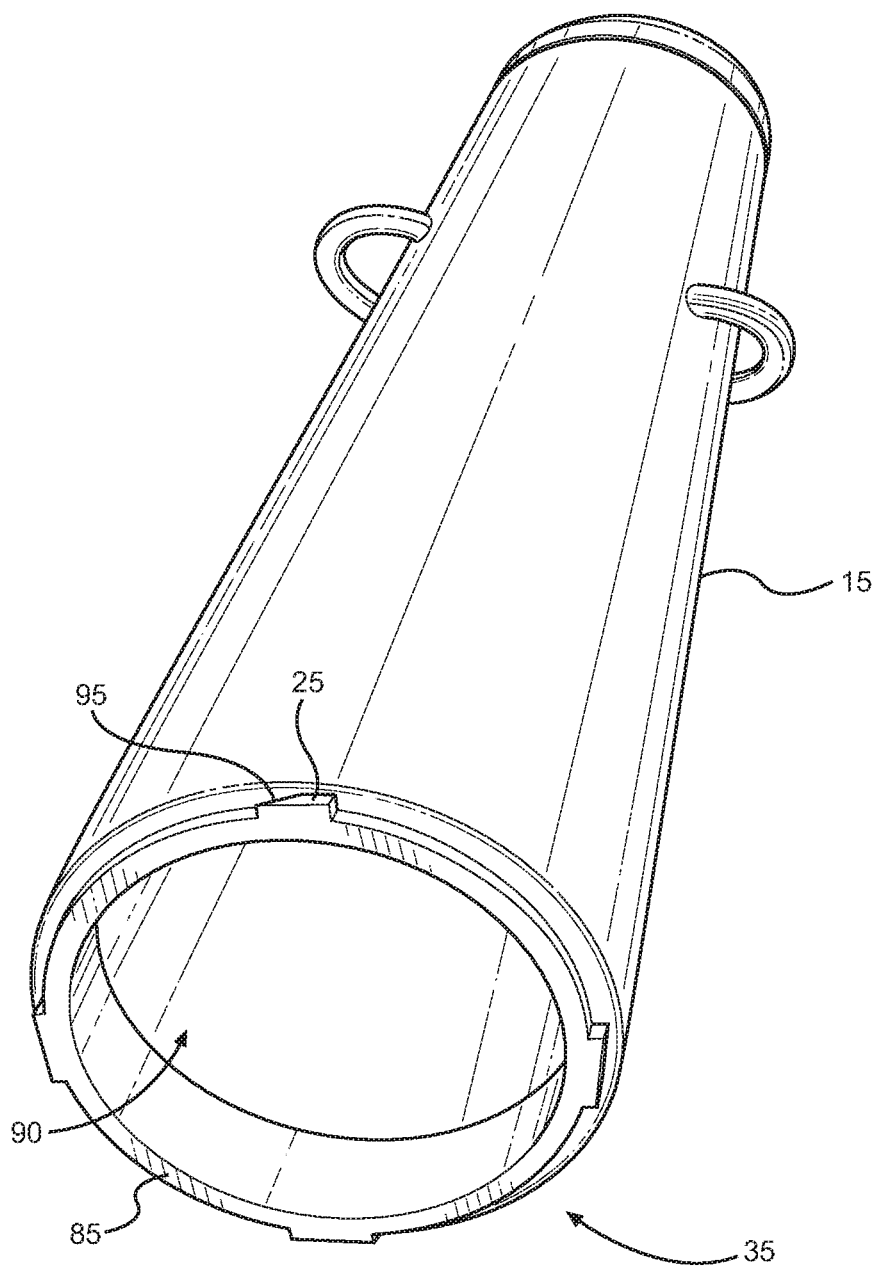
FIG. 2 shows a perspective view of the bottom end of the trash receptacle of the trash can assembly.
Figure 3A:
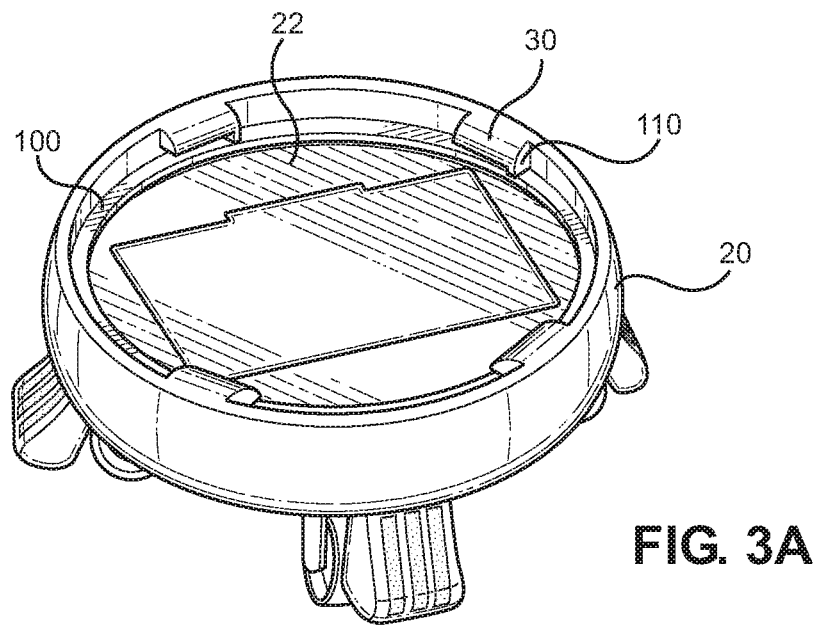
FIG. 3A shows a perspective view of the base of the trash can assembly.

Referring now to FIGS. 2 and 3A there is shown a perspective view of the bottom end of the trash receptacle and a perspective view of the base, respectively. The bottom end 35 of the trash receptacle 15 includes a lip 85 disposed annularly about a perimeter edge thereof. In the depicted embodiment, the lip 85 protrudes and extends vertically, downwardly away from the bottom end 35 and defines a bottom opening 90 that provides egress for a trash bag from the interior volume of the trash receptacle 15.

The base 20 of the trash can assembly 10 includes a channel 100 disposed annularly about an interior thereof. The channel 100 is configured to slidably receive the lip 85 therein and includes a smooth interior surface configured to enable the lip 85 to twist or rotate therein without limitation. In one embodiment, the channel 100 is sized such that the lip 85 can friction fit therein. The plurality of notches 25 are disposed evenly about a perimeter edge of the lip 85. In one embodiment, the lip 85 includes four notches evenly disposed around the perimeter edge thereof. The plurality of notches 25 protrude and extend perpendicularly, outwardly relative to the lip 85.

The plurality of sockets 30 are disposed about an upper perimeter edge of the channel 100. The plurality of sockets 30 extend from the edge over the channel 100 and are configured to receive the plurality of notches 25 thereunder.

Each of the plurality of sockets 30 includes a wall 110 that extends from a back end of each of the plurality of sockets 30 and into the channel 100 and prevents the notches from sliding past the sockets. The back walls 110 stop the plurality of notches 25 underneath the plurality of sockets 30, thereby securing the plurality of notches 25 thereunder. In this way, the plurality of sockets 30 catch the trash receptacle 15 via the plurality of notches 25 when any upward force is exerted on the trash receptacle 15, thereby preventing the separation of the trash receptacle 15 from the base 20. In the depicted embodiment, the plurality of notches 25 are rectangular in shape and include a tapered side 95 for facilitating the sliding of the plurality of notches 25 underneath the plurality of sockets 30. In this way, the plurality of notches 25 are not hindered when sliding underneath the plurality of sockets 30 by an uneven surface or tab.

Figure 3B:
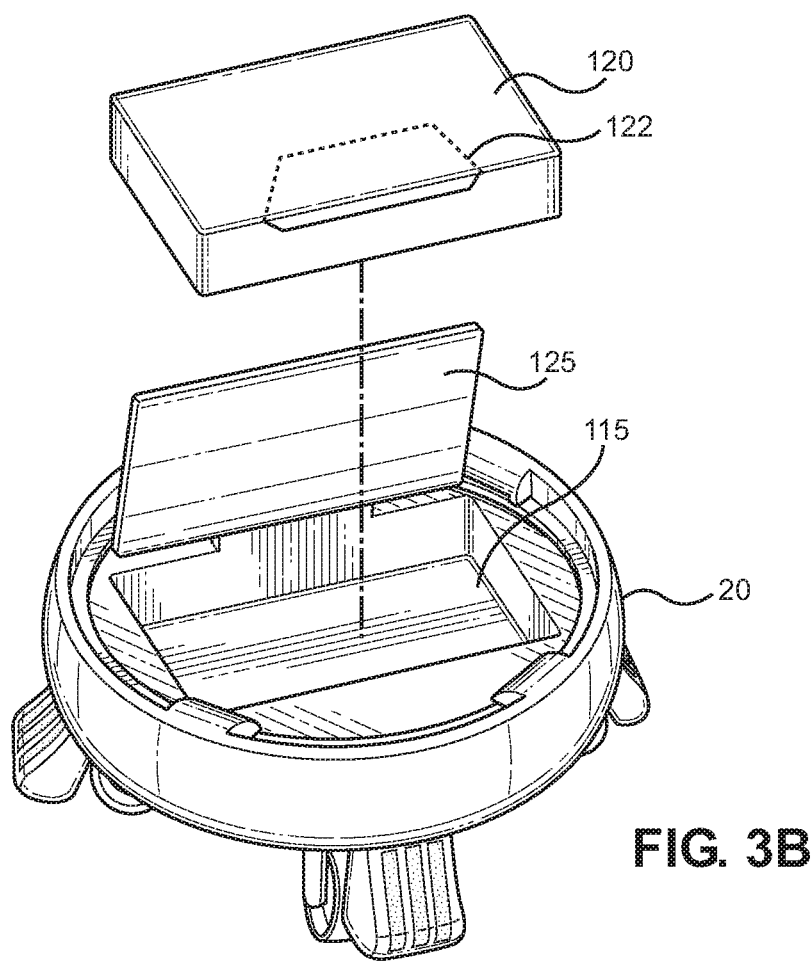
FIG. 3B shows a perspective view of the interior compartment of the base.

Referring now to FIG. 3B, there is shown a perspective view of the interior compartment of the base. The base 20 further includes an interior compartment 115 having an interior volume sized to receive a box 120 therein. The box 120 is configured to receive and store trash bags therein, and includes an opening 122 for providing access to the bags stored therein. In one embodiment, the interior compartment 115 and the box 120 are rectangular in shape such that the box 120 can fit flush inside of the interior compartment 115. In alternative embodiments, the interior compartment 115 and box 120 may include alternative complimentary shapes and sizes, such that the box can fit within the interior compartment 115. The interior compartment 115 further includes a cover 125 for providing access to the interior volume of the interior compartment 115. The cover 125 is hingedly connected to an edge of the interior compartment and includes a watertight seal, such that when closed, any liquids leaking from a garbage bag in the container do not seep into the interior compartment 115 and contaminate the box 120 and bags therein. In the depicted embodiment, in a closed position, the upper surface of the cover 125 is flush with the upper surface 22 of the base 20 so as to allow the trash receptacle 15 to rest in an upright position thereon.

Figure 4:
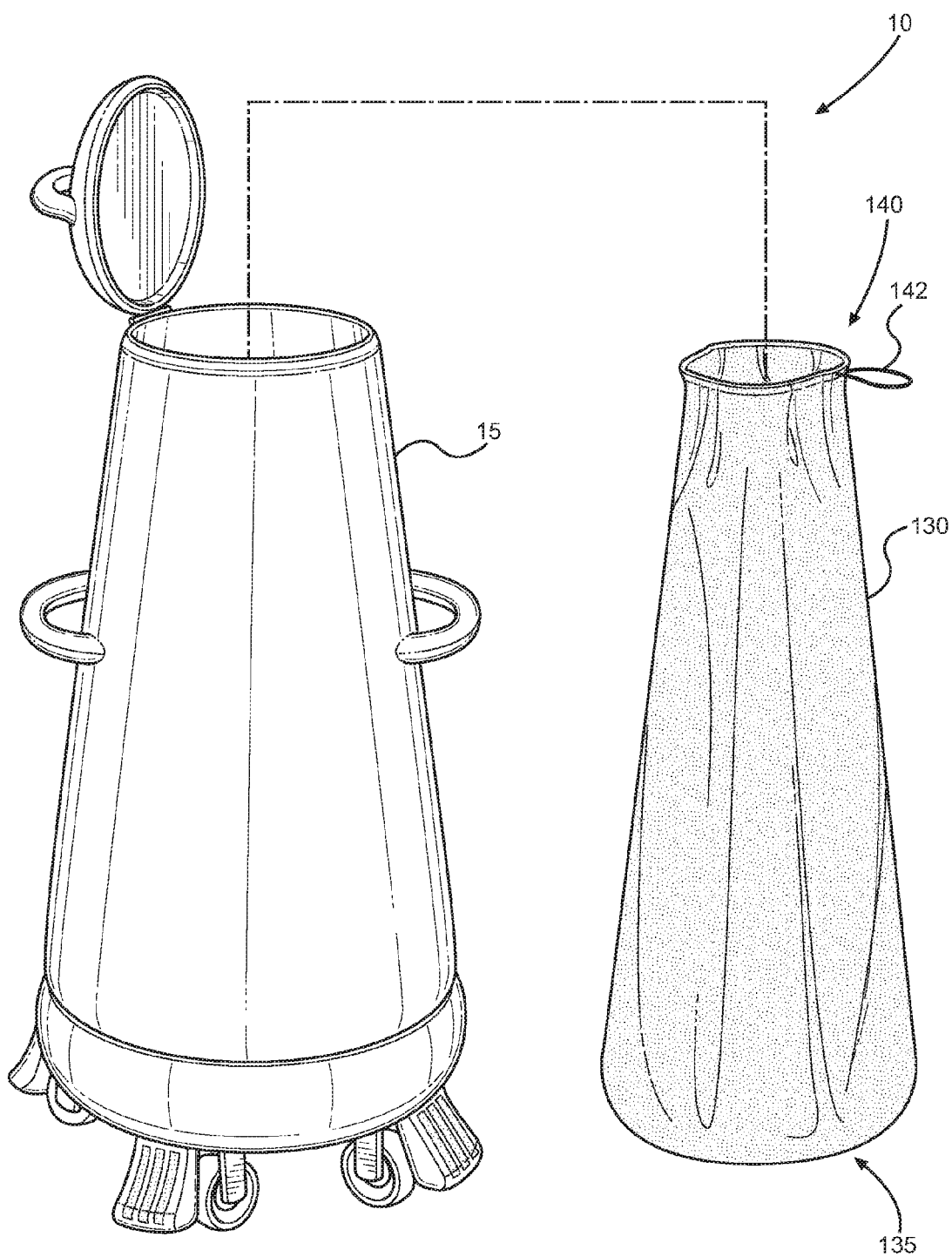
FIG. 4 shows a partial exploded view of one embodiment of trash can assembly.

Referring now to FIG. 4, there is shown a partial exploded view of one embodiment of trash can assembly. In one embodiment, of the trash can assembly 10 the trash can assembly includes a trash bag 130 having an interior volume for receiving trash therein. In the depicted embodiment, the trash bag 130 is unique to the trash can assembly 10 because it is the same size as the interior volume of the trash receptacle 15 and includes the same tapering shape as the trash receptacle 15, thereby providing a matching fit for the trash receptacle 15. The trash bag 130 includes the same tapering shape as the trash receptacle 15 in so far as the trash bag 130 tapers in diameter from a closed bottom end 135 to an open upper end 140. The open upper end 140 includes a drawstring 142 for tightening and closing the open upper end 140. The trash bag 130, however, includes a length greater than the length of the trash receptacle 15, such that the open upper end 140 extend past the opening of the upper end 40 of the trash receptacle 15, when inserted therein. In this way, the open upper end 140 of the trash bag 130 can be folded over the edge of the upper end of the trash receptacle 15.

Figure 5:
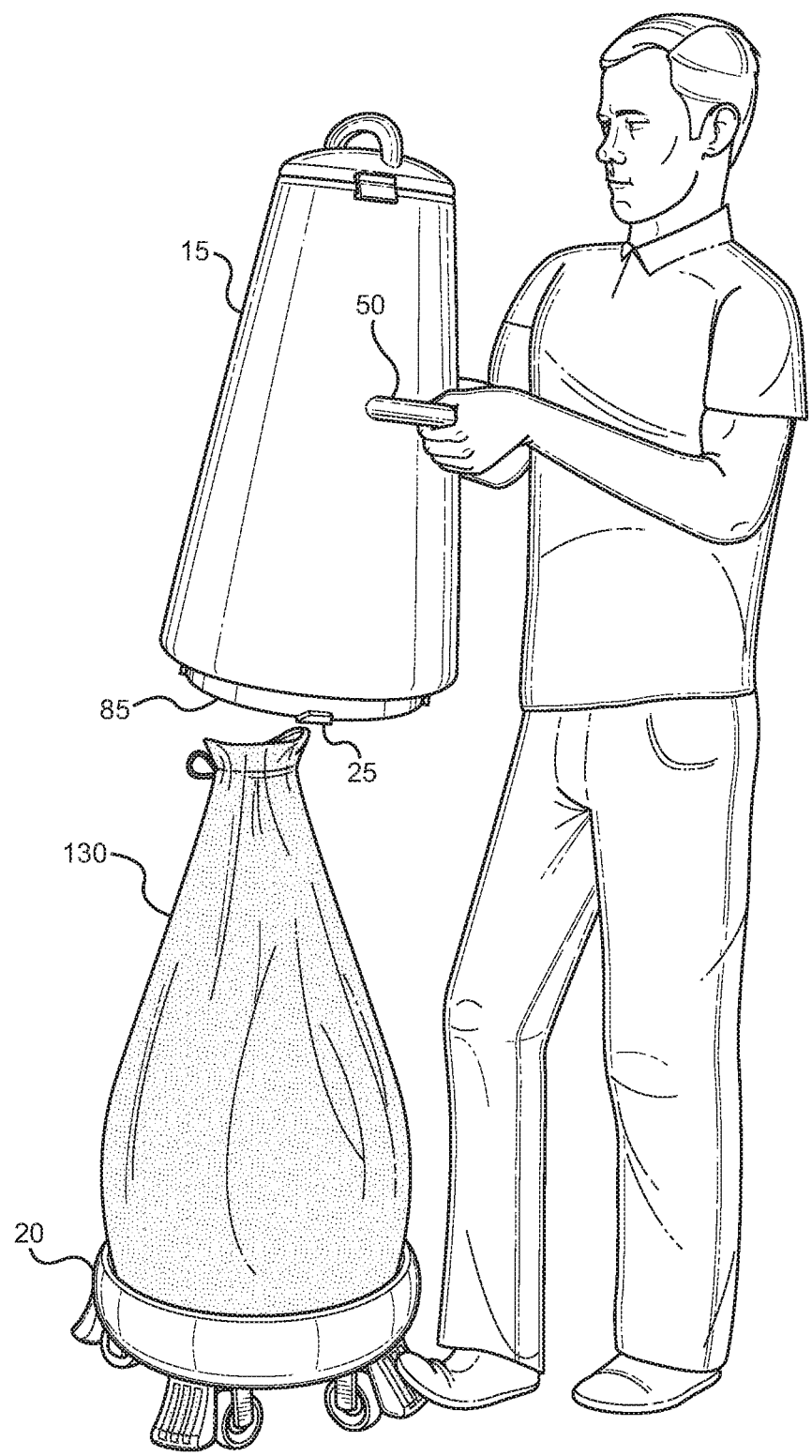
FIG. 5 shows a view of the trash can assembly in use.

Referring now to FIG. 5, there is shown a view of the trash can assembly in use. In one use, once the trash bag 130 inside of the trash receptacle 15 is filled, a user may, using the handles 50, twist or rotate the lip 85 of the trash receptacle 15 counterclockwise within the channel of the base 20 to disengage the plurality of notches 25 from the plurality of sockets. Once the notches 25 are disengaged, the user may lift the trash receptacle 15 up and away from the base 20 and remove and discard the trash bag 130. The user may then open the interior compartment of the base 20 and remove a bag therefrom. Next, the user may insert the lip 85 into the channel and rotate the trash receptacle 15 clockwise to slide the notches 25 underneath the sockets and secure them thereunder.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A trash can assembly, comprising:
   a trash receptacle including an upper end having an opening and a bottom end having an opening, the trash receptacle tapering in diameter from the bottom end to the upper end, such that the opening of the bottom end includes a diameter larger than a diameter of the opening of the upper end;
   the opening of the upper end for providing access to an interior volume of the trash receptacle, the interior volume for receiving a trash bag therein;
   the bottom end including a lip extending from the bottom end, the lip defining the opening of the bottom end;
   a plurality of rectangular notches annularly disposed around the lip, the plurality of notches extending perpendicularly outward relative to the lip and each notch includes a tapered side;
   a base including an interior channel for mountably receiving the lip of the trash receptacle, the interior channel annularly disposed about an interior of the base;
   the lip of the trash receptacle for rotating within the channel;
   the interior channel including a plurality of sockets for slidably receiving the plurality of notches thereunder, the plurality of sockets disposed about an upper perimeter edge of the channel, each of the plurality of sockets including a wall extending into the channel for stopping a forward progression of the plurality of notches and securing the notches under the plurality of sockets;
   a plurality of legs disposed annularly about a lower perimeter edge of the base, the plurality of legs extending downward and outward at an angle relative to the base;
   a plurality of wheels rotatably coupled to the base, the plurality of wheels disposed annularly about a lower end of the base.

2. The trash can assembly of claim 1, further comprising one or more trash bags tapering in diameter from a closed lower end to an open upper end, such that the one or more trash bags are sized to fit into the trash receptacle, wherein the open upper end includes a drawstring for tightening and closing the one or more trash bags.

3. The trash can assembly of claim 2, wherein each of the one or more trash bags includes a length greater than a length of the trash receptacle, such that when inserted into the trash receptacle the open upper end of the one or more trash bags protrudes from the upper end of the trash receptacle.

4. The trash can assembly of claim 1, wherein the base further includes an interior compartment having an interior volume sized to receive a box of trash bags, the interior compartment including a hingedly connected cover for providing access to the interior compartment.

5. The trash can assembly of claim 4, wherein the cover includes a watertight seal when closed.

6. The trash can assembly of claim 4, further comprising a box sized to fit into the interior volume of the interior compartment of the base, the base configured to house trash bags therein.

7. The trash can assembly of claim 4, wherein the plurality of notches include a tapered side.

8. The trash can assembly of claim 1, wherein each of the plurality of legs includes a front face having a curved surface for providing an area for users to position their feet when immobilizing the trash can assembly.

9. The trash can assembly of claim 8, wherein the front face includes a grip.

10. The trash can assembly of claim 9, wherein the grip includes a plurality of strips including a high-friction material, the plurality of strips extending along a longitudinal length of a leg.

11. The trash can assembly of claim 1, wherein the plurality of wheels are disposed behind the plurality of legs and include a length greater than a length of the plurality of legs, such that when the plurality of wheels are placed on a surface the legs are suspended above the surface in front of the wheels.

12. The trash can assembly of claim 1, further comprising a lid hingedly connected to an edge of the upper end, the lid for providing access to the opening of the upper end.

13. The trash can assembly of claim 12, further comprising a latch for fastening the lid to the trash receptacle.

14. The trash can assembly of claim 1, further comprising one or more handles disposed on an exterior of the trash receptacle.

* * * * *